March 26, 1968 P. F. MAEDER 3,374,670
NAVIGATION INSTRUMENTATION
Filed April 26, 1965 5 Sheets-Sheet 1

INVENTOR
PAUL F. MAEDER
BY,
Dike, Thompson, Bronstein & Mrose
ATTORNEYS

March 26, 1968  P. F. MAEDER  3,374,670
NAVIGATION INSTRUMENTATION
Filed April 26, 1965  5 Sheets-Sheet 2
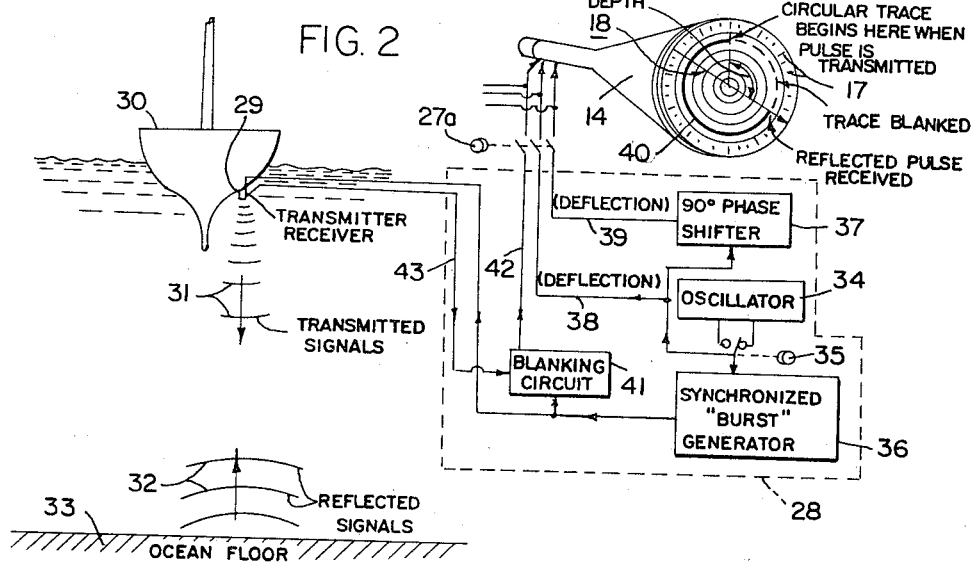
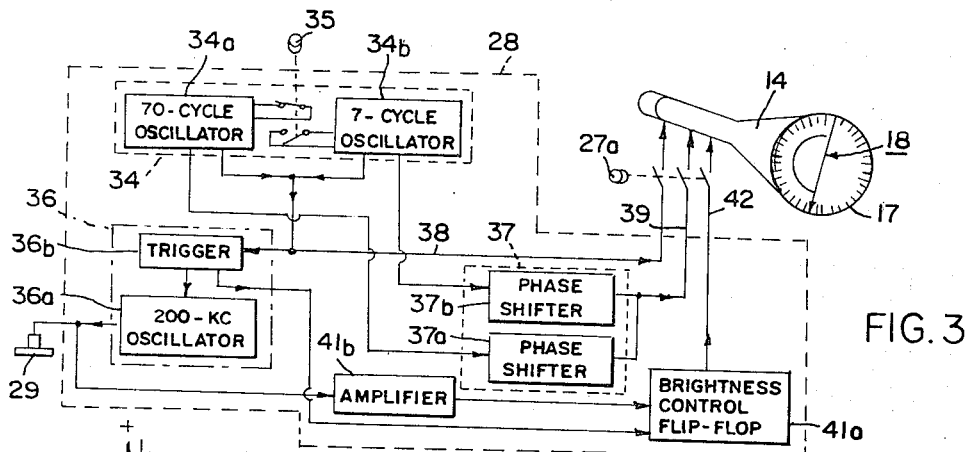
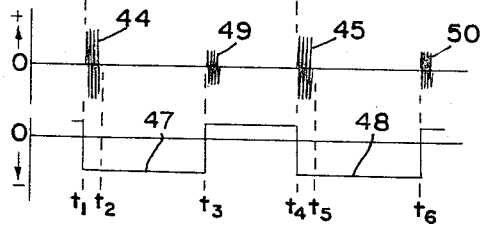
INVENTOR
PAUL F. MAEDER
BY,
Dike, Thompson, Bronstein & Mrose
ATTORNEYS March 26, 1968  P. F. MAEDER  3,374,670
NAVIGATION INSTRUMENTATION
Filed April 26, 1965  5 Sheets-Sheet 3

INVENTOR
PAUL F. MAEDER
BY
Dike, Thompson, Bronstein & Mrose
ATTORNEYS

March 26, 1968     P. F. MAEDER     3,374,670

NAVIGATION INSTRUMENTATION

Filed April 26, 1965     5 Sheets-Sheet 4

INVENTOR
PAUL F. MAEDER
BY,
Dike, Thompson, Bronstein & Mrose
ATTORNEYS

March 26, 1968  P. F. MAEDER  3,374,670
NAVIGATION INSTRUMENTATION
Filed April 26, 1965  5 Sheets-Sheet 5

INVENTOR.
PAUL F. MAEDER
BY
Dike, Thompson, Bronstein & Mrose
ATTORNEYS

United States Patent Office 3,374,670
Patented Mar. 26, 1968

3,374,670
NAVIGATION INSTRUMENTATION
Paul F. Maeder, East Providence, R.I., assignor, by mesne assignments, to MacCleaster-Schwarz, a division of William M. Pearson Travel Agency, Inc., Providence, R.I., a corporation of Rhode Island
Filed Apr. 26, 1965, Ser. No. 450,585
28 Claims. (Cl. 73—178)

ABSTRACT OF THE DISCLOSURE

Navigation instrumentation for measurement of different types of navigation data including a cathode ray tube display surface having navigation measurement indicia thereon, and control means for producing display data on the cathode ray tube in response to signals from one of a number of electrical transducers which are mounted in various positions on the craft. Each of the transducers sense the relation of the craft to the navigation condition under measurement and through their associated transmitting circuitry selectively apply signals representative of the navigation condition to the display control means, to give a visual indication on the display surface of the measured condition. The transducers and the transmitting circuitry are adapted to measure and transmit signals to the display tube representative of ocean floor depth, the direction and wind velocity relative to the craft, speed of the craft in the water, absolute wind velocity, radio direction finding information, and the orientation of magnetic north relative to the craft heading and radio direction.

The present invention relates to improvements in instrumentation for navigation purposes and, in one particular aspect, to novel and improved apparatus and practices for navigation of marine vessels wherein accurate measurements of different types of navigation data are uniquely and clearly presented via low-cost cathode ray tube displays.

Shipboard instrumentation has tended to become increasingly complex, bulky and expensive, with devices serving different measurement purposes being aggregated to form systems compatible with the owner's needs, interests, and financial resources. Thus it is that such diverse items as depth sounders, direction finders, logs, and the like, having independent and isolated output instruments, have simply been grouped together on small craft, and the navigator's function has become highly involved and demanding of technical training in use of the basically different forms of equipment. Beyond this, there has been an unsatisfied need for accurate displays of measurement information which are uncomplicated and can be easily developed and understood by relatively unskilled operators. In accordance with the present teachings, improved measurements of navigation data are achieved through apparatus and procedures which are aimed at promoting unique visual indications by cathode ray tubes, the various types of measurements being rendered compatible for separate selectable excitations of a single such display tube at different times, as they are found to be of interest to the user. The measurement sub-systems in this apparatus are thereby integrated into one overall system, with the sub-system electronic equipment preferably being constructed as plug-in units to provide flexibility in the use of as many or as few such equipments as may be warranted in any installation. These advantageous features derive in part from unique excitations of a cathode ray tube indicator in operating modes which effect optimum displays of measurement information with minimum complexity and high reliability of associated electronic excitation devices.

It is one of the objects of the present invention, therefore, to provide novel and improved instrumentation for aids to navigation of craft, wherein unique displays are achieved through cathode ray tube indicating equipment.

Another object is to provide versatile instrumentation of a plurality of different navigation measurements by way of selectable excitations of a calibrated cathode ray tube indicator by a plurality of compatible measurement sub-systems integrated into a single instrumentation unit.

A further object is to provide unique and advantageous cathode ray tube indications of navigation information, such as measurements of water depth, wind velocity and direction, ship speed, and bearings relative to magnetic and radio-frequency fields.

An additional object is to provide improve methods for the measurement of navigation information which combine simplicity with accuracy and clarity of display.

Still further it is an object to provide sonar depth-measurement apparatus of uncomplicated design and lending itself to advantageous excitations of a cathode ray tube indicator which exhibits depth information in a unique manner promoting readability and comprehension.

It is another object to provide improved equipment for the simultaneous display of both amplitude and direction of navigation data, such as wind velocity and direction.

And, a yet further object is to provide cathode ray tube indicating apparatus incorporated into relatively uncomplicated navigation systems uniquely capable of performing both measurement of craft speed in water and measurement of absolute craft speed.

By way of a summary account of practice of this invention in one of its aspects, a cathode ray tube, having horizontal and vertical deflection provisions which may be selectably excited by the output signals from a plurality of electrical measurement sub-systems, serves as a common indicator for each of the sub-systems and is adapted to develop a variety of beam trace conditions, including circular traces of predetermined and variable radial sizes. A calibrated transparent faceplate overlying the screen of the cathode ray tube (C.R.T.) bears concentric circular and angular graduations serving as measurement references for illuminated displays on the screen. For purposes of signalling depth of water below a craft, electrical pulses are generated periodically and are each used to excite the C.R.T. into developing a circular trace of some predetermined radial size; however, each such pulse is also used to trigger emission of a sonic burst from a sonar transducer directed downwardly of the craft and, simultaneously, to blank the circular trace only until the transducer receives a reflected signal from below the craft. The resulting trace is blanked over an angle characterizing water depth. Speed in water is separately indicated by the radial deflections, from center, of an electron beam responsive to electrical signals related to the electrical output of a log in the form of a screw-driven generator or the like. Two 90°-displaced sinusoidal signals developed by an anemometer-driven generator produce a circular trace of radial size related to wind velocity, and a brightening of the trace at a predetermined angle corresponding to the angle at which a wind vane is oriented in relation to the craft provides an indication of wind direction. Superpositioning of the vectorial wind data and water speed data effects a C.R.T. display of absolute wind speed.

Although the aspects and features of this invention which are believed to be novel are expressed in the appended claims, additional details as to preferred practices and embodiments, and as to the further advantages, objects and features thereof, may be most readily comprehended through reference to the following description taken in connection with the accompanying drawings, wherein:

FIGURE 1 pictorially represents navigational display apparatus used in a preferred practice of the invention;

FIGURE 2 illustrates an improved depth-measurement arrangement embodying teachings of this invention, the illustration being partly in block-diagrammed and pictorial forms;

FIGURE 3 is a detailed block-diagram of depth-measurement equipment such as that appearing in FIGURE 2;

Figure 5:
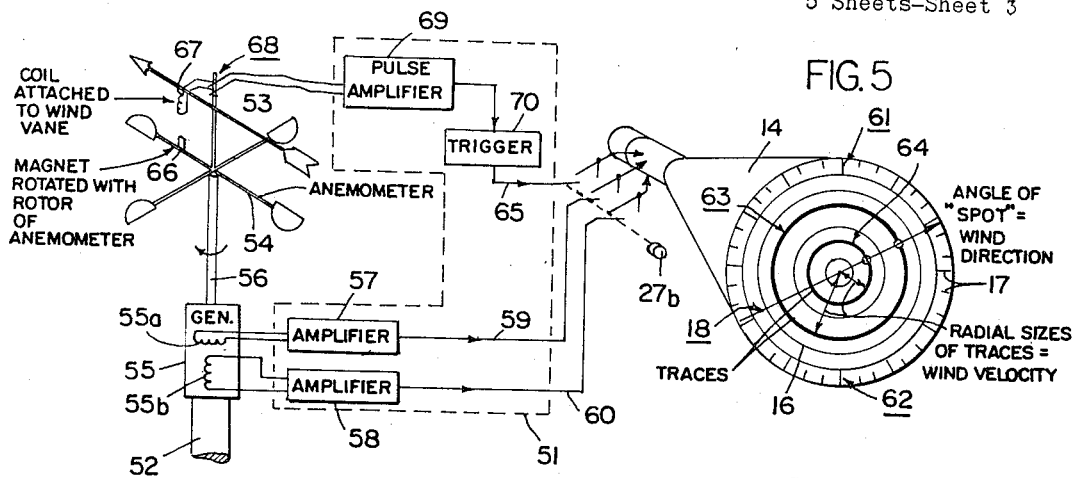
Figure 6:
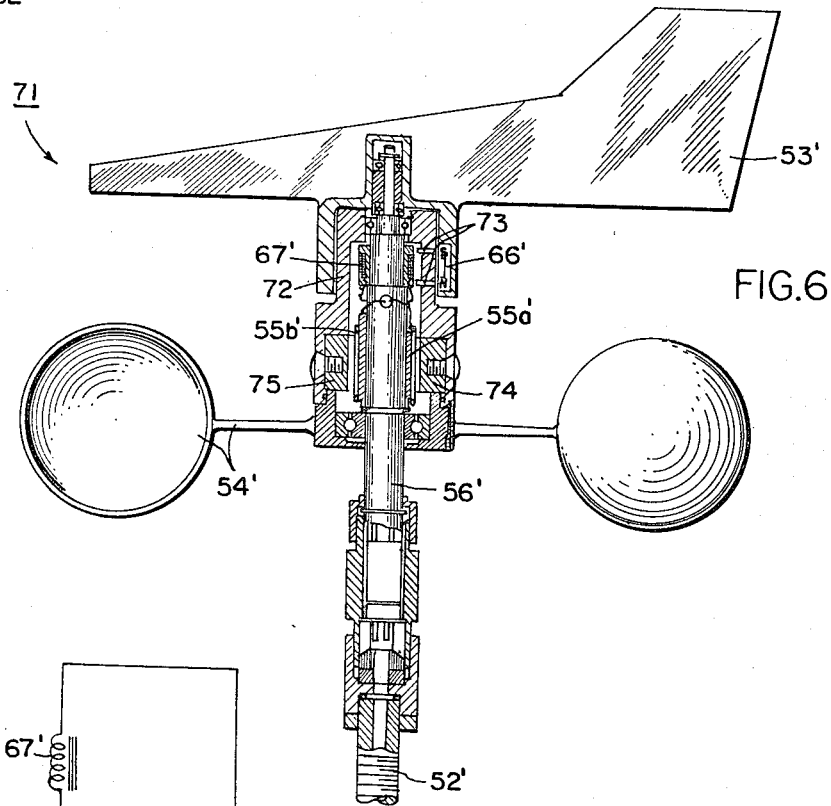
Figure 7:
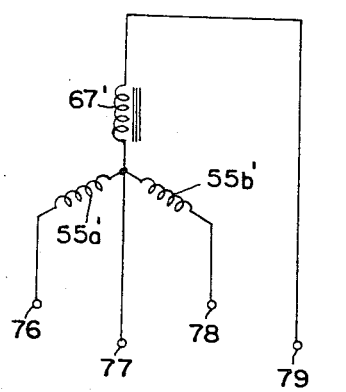
Figure 8:
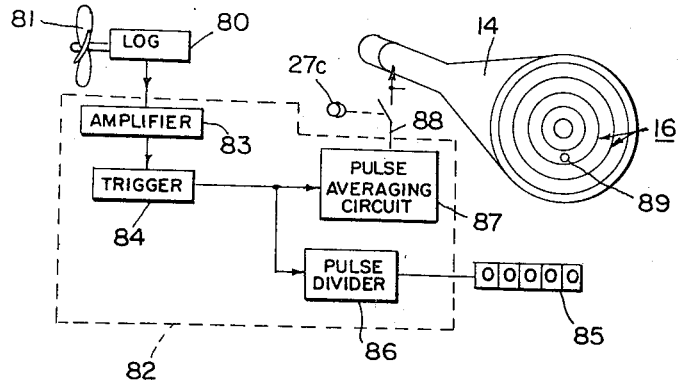
Figure 9:
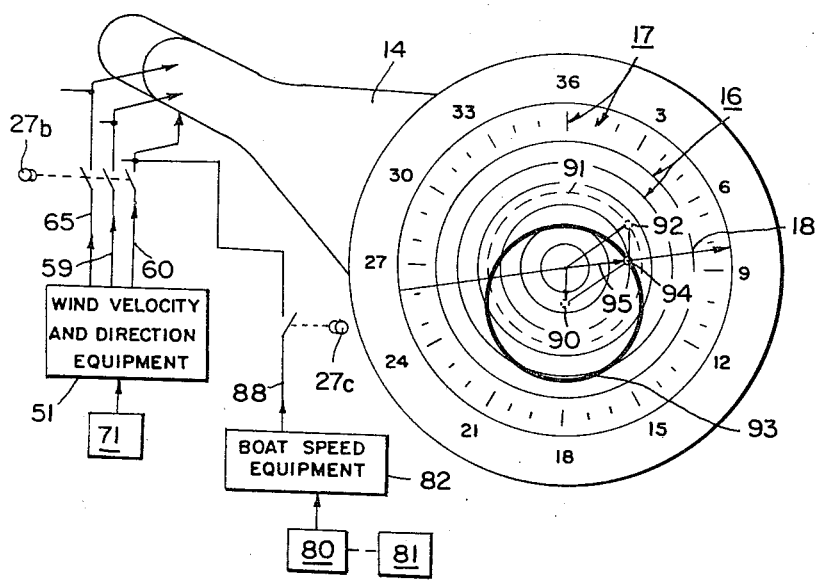
Figure 10:
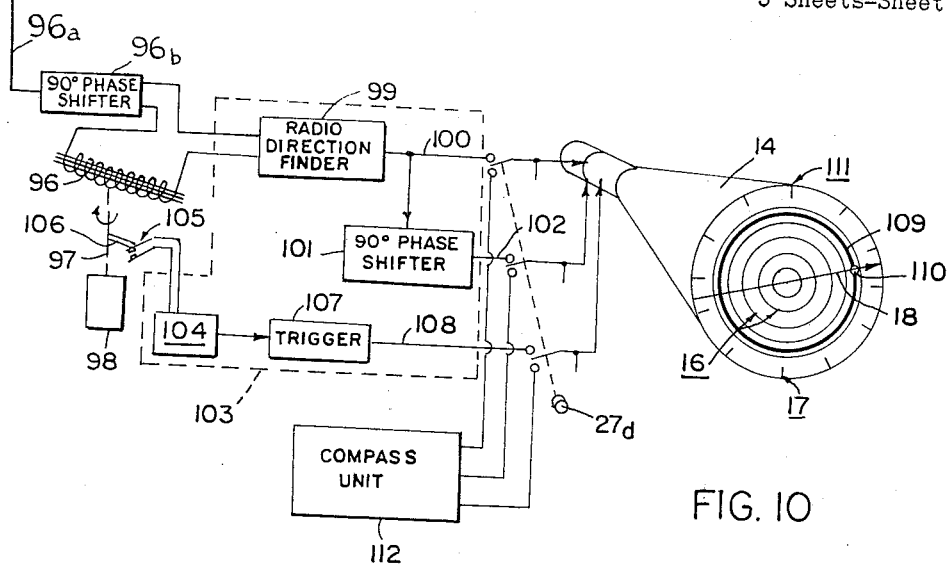
Figure 11:
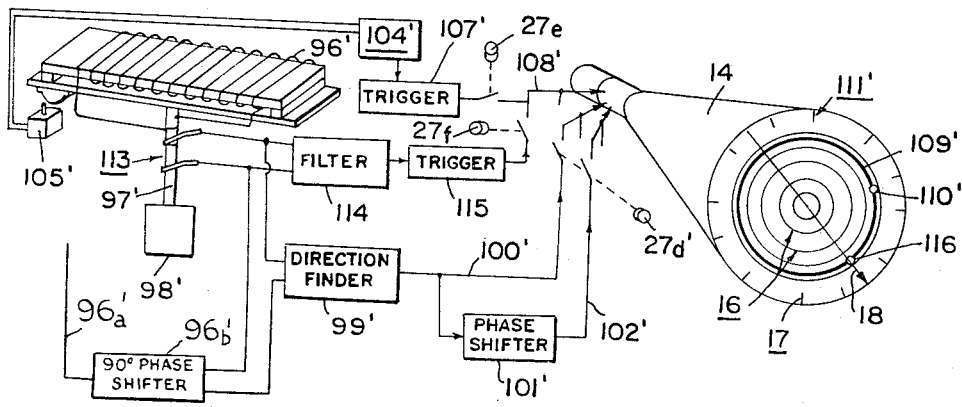
Figure 12:
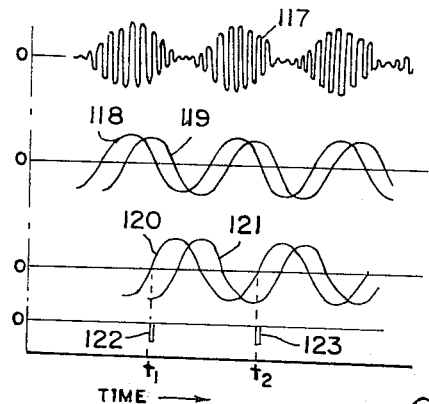

FIGURE 4 graphically represents time-coordinated electrical signals developed in the depth-measurement equipment of FIGURE 3;

FIGURE 5 provides a partly schematic and partly block-diagrammed representation of improved wind velocity and direction apparatus;

FIGURE 6 is a partly cross-sectioned portrayal of an anemometer and wind vane unit intended for use in apparatus such as that of FIGURE 4;

FIGURE 7 presents an elementary schematic electrical diagram for the unit of FIGURE 5;

FIGURE 8 is a partly pictorial and partly block-diagrammed arrangement for the measurement of boat speed in water;

FIGURE 9 depicts a C.R.T. navigation indicator under unique conditions of excitation which cause it to characterize absolute wind speed;

FIGURE 10 provides a partly schematic and partly block-diagrammed illustration of improved apparatus for measurement and display of radio-direction and/or magnetic-compass direction;

FIGURE 11 represents a preferred embodiment of the type of apparatus shown in FIGURE 10, wherein radio-direction and magnetic-compass direction signals are processed simultaneously; and FIGURE 12 presents graphically a set of time-coordinated wave forms such as are present in the navigation equipment of FIGURES 10 and 11.

Figure 1:
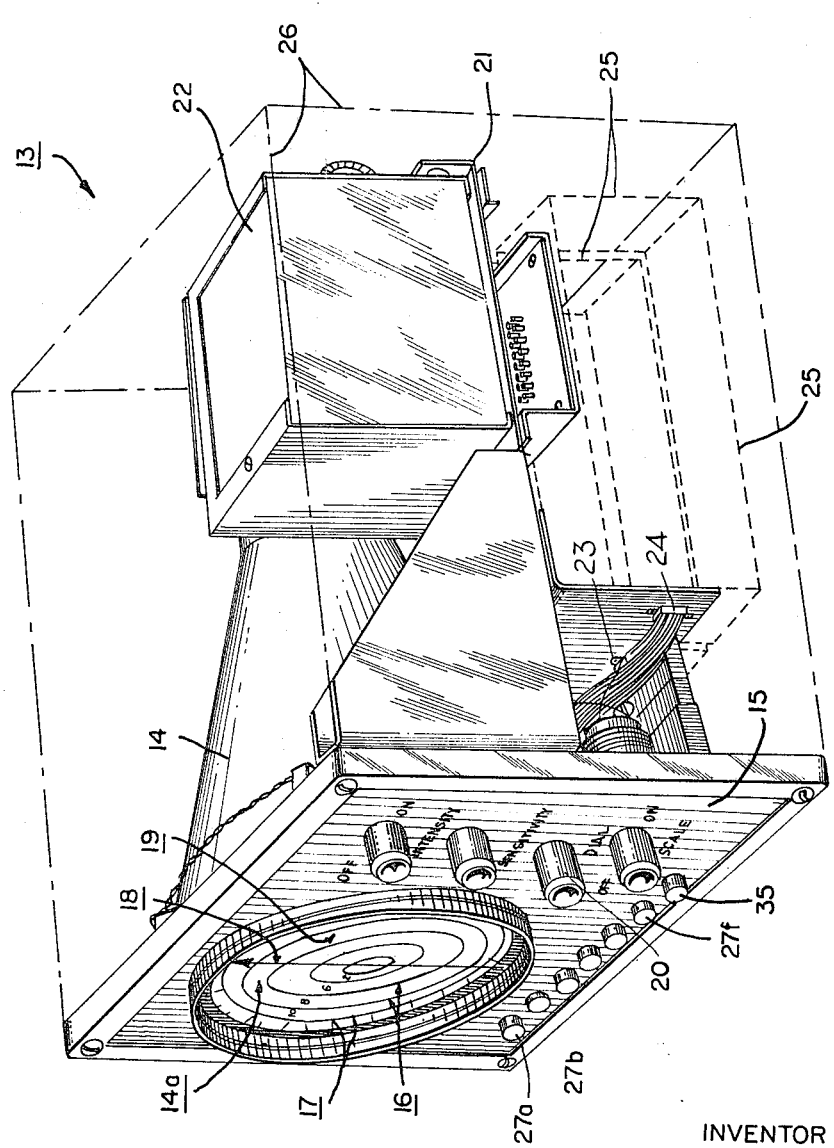

The marine navigational display apparatus 13 portrayed in FIGURE 1 includes a shielded cathode ray tube device 14 having its phosphor-coated screen 14a circularly masked by a mounting and control panel 15; and having superposed radial and angular indicia 16 and 17, respectively, marked either directly upon the glass face or, preferably, upon a transparent plastic dial plate overlying the face of the tube. In addition, a diametrically-extending lubber line 18 borne by a circular transparent disk 19 is angularly adjustable in response to manipulations of a dial knob 20 on the panel 15. Power supply and standard C.R.T. excitation equipment are permanently associated with the chassis 21, as exemplified by the enclosure designated by reference character 22, and a set of plug-in connectors, such as connectors 23 and 24 to the rear of control panel 15, serve to connect only such plug-in circuit modules as are needed to meet the user's requirements. These modules, which are preferably of compact printed-circuit constructions, cooperate with the C.R.T. display equipment to provide measurements and indications of marine navigation data such as water depth, speed in water, wind velocity and direction, absolute boat speed, and compass and radio direction. Dashed linework 25 characterizes the location of some of these modules within the overall enclosure designated by doubly-dashed linework 26. Each different measurement and display operation is effected by depressing a different one of the push-button selectors 27a–27f on the control panel, whereupon the C.R.T. 14 common to all the measurement circuits provides a visual output characterizing the phenomenon selected for exhibition at any time. The one apparatus thus integrated all of the most useful marine navigational systems into a single electronic unit, and all the measured information is presented by but one indicator. As will also appear from the descriptions which follow, the C.R.T. indicator employed for these purposes uniquely provides highly precise and readily-interpreted displays and, at the same time, advantageously enables the associated measurement elements and circuitry to assume uncomplicated forms.

In FIGURE 2, a depth-sounding operation is shown to involve the C.R.T. indicator 14 in a selected association with components of a plug-in circuit module 28 and a transducer 29 which are responsible for generation, transmission and reception of short bursts or pulses of supersonic signals, as well as electron-beam controlling signals for the display tube, when the selector switch button 27a is depressed. Although interests of clarity in illustration prevented a showing of the indicator and associated electronic circuitry aboard the marine craft 30, it should of course be understood that they are so located in practice. In a generally conventional manner, the downwardly-directed transducer 29 radiates short bursts of supersonic energy (transmitted signals 31) from a predetermined position along the hull and below the waterline of the boat to the ocean floor 33 below, from whence it is re-radiated (reflected signals 32) and impinges upon the same transducer which, at such moments, functions also as a receiver. The transducer may comprise a known type of sealed piezoelectric unit, for example. Oscillator unit 34, which generates two related signals, has its outputs selected by switch 35 to apply one or the other of these simultaneously to a synchronized "burst" generator 36, to a 90° phase shifter unit 37, and to one (38) of the two vertical and horizontal deflection circuit lines for the indicator 14. Phase shifter unit 37 brings its output into quadrature relationship with the input applied to it, and delivers this output to the other of the deflection circuit lines, 39, such that the combined 90° related equal-amplitude signals in lines 38 and 39 tend to produce a circular illuminated trace 40 on the screen of the cathode ray display tube. It should be understood that the C.R.T. deflection system may be of either the electrostatic or electromagnetic types, and that the quadrature relationship of signals may be derived from two portions of an oscillator wherein the signals are displaced in phase and it is then merely required that the phase of one be shifted by something less than 90° to achieve the desired result. Oscillator unit 34 may conveniently comprise a pair of oscillators designed to generate 7- and 70-cycle outputs, respectively, whereby the resultant circular full-scale traces 40 are calculated to represent ranges of about 360- and 36-feet of water depth, respectively. Burst generator 36 is designed to produce a brief (ex. 0.3 or 0.4 millisecond) output of supersonic energy (ex. at 200 kc.) whenever the sinusoidal oscillator output applied to it changes polarity (ex. passes from negative to positive). Each such burst output is delivered to transducer 29, for radiation from it, and, simultaneously, is applied to a blanking circuit, 41, which responds by causing the trace 40 to be blanked by a signal fed to the control electrode (grid) line 42 for tube 14. Reflected signals picked up by transducer 29 are likewise delivered to blanking circuit 41, via coupling 43 and cause the trace to become unblanked (i.e. illuminated and visible) for the remainder of the circular trace and until a further burst output is witnessed. These actions result in a blanking of trace 40 over an angular span, from the topmost reference position, which is accurately related to the water depth being measured at any time. Angular graduations 17, calibrated in a clockwise pattern, aid in characterizing the measured depth, together with the adjustable lubber line 18. Radial size variations in the trace do not disturb these measurements.

Further details concerning perferred electronic circuit provisions for the module 28 appear in FIGURE 3. There, the oscillator unit 34 is shown to include two oscillators, 34a and 34b, which develop outputs at 70 and 7 cycles per second, respectively. The associated phase shifters 37a and 37b, respectively, serve to adjust the phases of 70- and 7-cycle outputs from these oscillators so that they are in guadrature relationships with the other oscillator outputs selectively applied to tube 14 over line 38, whereby the desired circular traces are provided at these frequencies. Selector switch 35 serves to turn one oscillator on and the other off, so that only one is effective at any time. Phase shifters 37a and 37b introduce only so much shift as may be required for the quadrature phasings, and may therefore comprise simple resistance-capacitance networks when the tapped signals applied to them are already displaced in phase from the main oscillator outputs. Burst oscillator unit 36 includes a 200-kc. oscillator 36a and a Schmitt trigger circuit 36b, the latter being controlled by the outputs of sinusoidal oscillators 34a and 34b to produce brief (ex. 0.3–0.4 millisecond) output pulses each time the applied oscillator signals cross from negative to positive polarities. These short pulses are applied to the 200-kc. oscillator 36a, causing it to emit a corresponding 0.3–0.4 millisecond burst of 200-kc. signals which is, in turn, delivered to the transducer 29 for radiation. In FIGURE 4, the pulse bursts 44 and 45 characterize those periodically generated in a known way by the burst oscillator 36a; these are of like time intervals $t_1$–$t_2$ and $t_4$–$t_5$, respectively, and result from the trigger pulses 44a and 45a applied to this oscillator by trigger circuit 36b. The latter trigger pulses are generated beginning at times $t_1$ and $t_4$, when the sinusoidal signal 46 from one of the oscillators 34a and 34b is at the cross-over position where polarity changes from negative to positive, in accordance with known practices in synchronizing trigger circuit operation with a sinusoidal signal. Brightness control flip-flop unit 41a in FIGURE 3 is also triggered by pulses such as 44a and 45a (FIGURE 4) into a conducting state which produces a blanking biasing signal for the C.R.T. grid, i.e. the electron beam trace is not of sufficient intensity to be visible on the screen. Pulses 47 and 48 characterizes these blanking signals. At times related to the depth of water being sounded, reflected burst pulses such as those designated 49 and 50 in FIGURE 4 are received by the transducer 29 and are delivered to brightness control flip-flop 41a after amplification by amplifier 41b. Units 41a and 41b thus correspond to the blanking circuit 41 in FIGURE 2. These reflected burst pulses cause flip flop 41a to return, in a known manner, to a conducting state wherein it exhibits a different signal, used for biasing the C.R.T. grid, sufficient to cause the trace intensity to increase to a distinctly visible level. As shown in FIGURE 4, the trace blanking times are from $t_1$ to $t_3$ and from $t_4$ to $t_6$, and the traces appearing during the remainder of each cycle of oscillator signal 46 are visible to the observer. In the example illustrated signal 46 is applied to develop horizontal sweep, and a comparable 90°-displaced signal is applied to develop vertical sweep of the tube 14, whereby each cycle is traced clockwise beginning at the top center of the circular screen. The angle over which the trace is blanked (i.e. not visible) represents water depth, and is conveniently translated into feet by rotating the lubber line 18 to the spot where the trace begins and reading the nearby graduated indicia 17 underlying the lubber line. In an alternative arrangement, the trace may obviously be made visible only for the angular distance characterizing measured depth, and the trace may be begun at some angular position around the circular screen other than the top if that is preferred.

Direction and velocity of wind relative to the supporting craft are advantageously displayed by C.R.T. indicator 14 in terms of a full circular trace the radial size of which characterizes velocity and a sharp discontinuity in which (such as a brightened spot) characterizes the angular direction relative to the craft. As is shown in FIGURE 5, the associated electronic equipment 51 needed to promote such displays by the indicator assumes a remarkably simple form. At a convenient sensitive position, such as atop a ship's mast 52, there are mounted a wind vane 53, a nearby anemometer 54, and a two-phase generator 55. Wind-induced rotation of the anemometer causes rotation of the attached shaft 56 which drives a magnetic armature of generator 55 and thereby results in generation of 90°-displaced electrical output signals in the two generator windings 55a and 55b. Amplifiers 57 and 58 translate these sinusoidal output signals into amplified versions suitable for excitation of the vertical and horizontal deflection elements of the C.R.T. indicator 14 via lines 59 and 60. One of the two windings, which are both fixed in relation to the supporting craft, is oriented to develop a maximum positive output or peak when the rotated magnetic armature is instantaneously aligned in the foreaft direction of the boat, whereby the topmost or "12-o'clock" angular position 61 on the indicator scale will always represent the orientation of the bow and the diametrically opposite position 62 represents the orientation of the stern when the relative wind direction is to be read from the indicator. Measurements of wind velocity, in a directionless sense, are taken from the radial sizes of the circular traces, such as the two different traces 63 and 64, which are visible on the C.R.T. screen when the wind velocities are relatively high and low, respectively. Concentric circular graduations 16 aid in the reading of such measurements, and numerical markings (not shown in FIGURE 5) for certain of these graduations are also provided to facilitate these readings.

Wind direction is conveniently signalled on the same traces which characterize velocity. In the illustrated embodiment, brightening or intensification of a localized spot at some angular trace position represents the direction; two such brightened spots are shown underlying lubber line 18 in FIGURE 5, evidencing a common wind direction for the two velocities (which are displayed singly, at different times). The desired brightening or intensification of the traces, needed to characterize direction of wind relative to the craft, is achieved by applying to the C.R.T., over line 65, short pulses of the appropriate polarity to cause trace intensification. For these purposes, a permanent magnet 66 is affixed to one of the radial arms of the anemometer 54, and is therefore in a predetermined angular relationship with the directional magnetization of the armature of generator 55; coil 67 affixed to the angularly movable wind vane 53 is disposed to have electrical signals induced in it by magnet 66 as the anemometer rotates and the wind vane remains relatively stationary at the various headings determined by the existing wind directions. Wind vane 53 is of course mounted for angular movements independently of anemometer 54. These induced signals are withdrawn by way of a slip-ring coupling 68, and are delivered to an amplifier 69 which insures that the output applied to a trigger circuit 70 will be of adequate amplitude and sharpness even when the induced signals are low and broad under light wind conditions. Trigger circuit 70 is of a conventional form which generates a predetermined sharp pulse output of uniform width and height each time it responds to an input signal, from amplifier 69. The spot or point brightening is thus uniform for all normal operating conditions of the system. In an alternative arrangement, the trace discontinuity signifying wind direction may be something other than a brightened spot, such as a spike resulting from application of the pulses from trigger 70 to the deflection lines 59 and 60. Another possible operating mode involves control of intensification of the beam trace so that only the direction "spot" is visible to the observer, its radial distance from the center serving to characterize velocity; however a full visible circular trace is commonly more readily interpreted by the observer.

A preferred embodiment of wind velocity and direction sensor, 71, appears in FIGURE 6, wherein certain parts which are functional equivalents of those depicted in FIGURE 5 are designated by the same reference characters, with distinguishing single-prime accents added. In the more detailed embodiment, the relatively small permanent magnet 66' is angularly oriented by the movable wind vane 53', and the associated pick-up coil 67' is affixed to the stationary mast-mounted shaft 56'. Intermediate the magnet 66' and bobbin-mounted pick-up coil 67' is a portion of a rotatable bearing-mounted hub 72 for the anemometer cups 54', the hub 72 being provided at one angular position with a pair of magnetic pole pieces 73 disposed to couple relatively large amounts of flux from magnet 66' through the magnetic bobbin for pick-up coil 67' whenever these rotated pole pieces pass between the bobbin and magnet. Coil 67' has the desired pulse of current induced in it at such times. Generator coils 55a' and 55b' are likewise fixedly secured to member 56', and have sinusoidal signals in quadrature phase relationship induced in them by the rotated magnetized poles 74 and 75 fastened to the anemometer hub 72. All electrical connections are conveniently made with the stationary coils, through the hollow shaft 56', without resort to slip-ring couplings. The simple electrical circuit arrangement of the three coils is represented in FIGURE 7, wherein one phase of output appears between terminals 76 and 77, another displaced 90° in phase from the first appears between terminals 77 and 78, and the direction-characterizing pulse output appears between terminals 77 and 79.

Boat speed in water is displayed with great simplicity in terms of displacements of a single spot from the center, or some other predetermined position, of the screen of C.R.T. indicator 14 of FIGURE 8. These displacements are developed by applying to one of the deflection provisions, such as the vertical deflection plates or coil, electrical signals related to the boat speed as measured by a log 80 driven by a screw or propeller 81 disposed below the water line. Log generator 80 may be of a conventional form which includes an armature rotated by the propeller and which generates a sinusoidally-varying voltage having a frequency related to the rates of propeller rotation resulting from its movement through the water at various speeds. Electronic circuit module 82 responds to the log generator output by first amplifying it, in amplifier 83, and by then using the amplified sinusoidal signals to synchronize the production of uniform-with uniform-height pulses by a Schmitt trigger circuit 84, or equivalent. The repetition rate at which circuit 84 develops the standardized pulses is thus directly related to the frequency of output from log generator 80, and, hence, to the boat speed in water. An electromagnetically-actuated counter 85, of known construction, is shown to be used to count a sub-multiple of these pulses, as prepared by a conventional pulse divider 86, and thereby to register the total distance travelled. These same pulses from circuit 84 are delivered to a pulse averaging circuit, 87, which in one simple version includes a capacitor charged by the pulses and discharged at a controlled rate to exhibit an average electrical signal level related to the repetition rate of the pulses. This averaged signal in turn controls the excitation of one of the C.R.T. deflection provisions via line 88 whenever the appropriate control panel button, 27c, is depressed. In the illustrated case, the C.R.T. deflections are vertical, and polarity of the averaged signals is such as to cause deflections of the illuminated spot 89 downwardly from the center of the indicator screen. Concentric circular graduations 16, together with associated numerical speed markings (not shown), aid in reading the spot deflections in terms of the boat speed. It should be evident that the null position of the spot, representing zero speed, may be located elsewhere on the screen, by application of appropriate fixed deflection biasing, and that speed-responsive deflections may be horizontal and may be read in relation to a separate scale. Moreover, the spot or dot illumination may be converted to other configurations, such as a short line, by applying appropriate sweep deflection signals in addition to the speed deflection signals.

A vector addition of boat and wind velocities yields an absolute wind velocity indication in a particularly simple manner. For this purpose, indicator 14 in FIGURE 9 is excited both by the boat speed and wind velocity and direction circuit modules, 82 and 51, respectively. Push-button switches 27b and 27c are simultaneously closed, for this measurement, or, alternatively, their combined functions may be served by a further switch. For a representative condition in which the boat speed would tend to deflect a spot to the dashed-line position 90, and a trace 91 with a brightened spot 92 (as shown in dashed linework) would tend to be created by the co-existing wind velocity and direction, the resultant electron beam deflections will develop the circular trace 93 with a brightened spot 94 characterizing the absolute craft velocity. Radial distance 95, and the angular orientation measured by lubber line 18, then represent the absolute or resultant velocity and the resultant direction at that velocity. Visibility of trace 93 is not important in such instances, and this may be suppressed by control of the normal level of grid excitation, the locus of brightened spot 94 alone being sufficient to designate resultant velocity and direction in relation to indicia 16 and 17 respectively.

Magnetic compass and radio direction finding information is conveniently displayed in particularly meaningful and advantageous terms on the C.R.T. indicator 14 of FIGURE 10. Directionality of electromagnetic radiation from a remote radio station is established by a generally-conventional type of inductor coil 96, rotated at a substantially constant speed by the drive shaft 97 of an electric motor 98 fixed with the supporting craft, preferably in conjunction with a simple vertical or whip-type antenna 96a. A radio direction finder receiver 99, which is a simple radio tunable to frequencies of interest, is excited by the series combination of outputs of coil 96 and the output of antenna 96a which has been shifted 90° by a shifter 96b. This receiver delivers its sinusoidally-varying electrical output to one of the horizontal and vertical C.R.T. deflection circuit lines 100, and also delivers this output to a phase shifter 101 (such as a Wien bridge oscillator circuit used as a 90° phase shift amplifier) which develops a related sinusoidally-varying electrical signal in quadrature relation to the first and applies it to the other of the deflection circuit lines 102. Within the same circuit module, 103, there is located a circuit 104, such as a source and impedance which develops an electrical pulse whenever the normally-open contacts 105 are momentarily closed by wiping action of a member 106 affixed to the drive shaft 97. Each time the rotated member 106 encounters the contact assembly 105, which is held in a fixed angular position about the shaft relative to the boat (such as a position in alignment with the bow of the boat), a pulse is delivered to a trigger circuit 107. The latter is a known type of multivibrator which responds to the input by developing an output pulse of predetermined width and height and applies this to the control grid line 108 for the indicator tube 14. A circular trace 109 is developed on the face of tube 14 as the result of the quadrature-related deflection signals applied to lines 100 and 102, and the angular orientation of a brightened or intensified spot 110 thereon resulting from the pulses applied to the intensifying grid line 108 characterizes the angular heading of the boat relative to the location of the radio station tuned in at any time. The combined outputs of coil 96 and antenna 96a (as shifted in 96b) yield a maximum resultant signal only once during each revolution of coil 96, and thus eliminate an ambiguity, which could otherwise occur. Application of the 90° phase-shifted signals derived from receiver 99 to the C.R.T. deflection unit (coils or plates) in the manner shown thus necessarily results in the location of the station being at the top or "12 o'clock" position 111 on the C.R.T. screen; the R.F.-induced output is a minimum when coil 96 is aligned with a station. The angle of brightened spot 110 from the top position as measured by lubber line 18, thus represents the angular departure of the boat fore-aft axis from the radio station. Magnetic compass unit 112 is of about the same construction, involving an inductor coil like coil 96, and operates in essentially the same way to produce like indications of the boat heading relative to magnetic north when switch 27d is set to connect it with indicator 14.

A preferred alternative to the arrangement of FIGURE 10 appears in FIGURE 11, wherein the magnetic and radio direction-finding circuitry may also cooperate to display the orientation of magnetic north relative to the radio station and boat headings. Functional equivalents of the elements and components illustrated in FIGURE 10 are marked with the same reference characters bearing distinguishing single-prime accents. The single ferrite-core winding 96′ there responds to both the magnetic and radio-frequency signals, delivering signals related to the latter to deflection lines 100′ and 102′ in the phased relationship needed to generate a circular trace 109′. Slip ring coupling 113 also serves to apply induced signals to a low-frequency filter 114, tuned to a frequency below radio frequencies and discriminating in favor of magnetically-induced signals appearing as a result of the low-speed rotation of coil 96′ by motor 98′. The filtered sinusoidal signals are then applied to a known form of Schmitt trigger circuit 115, causing it to develop, synchronously, uniform-width pulses of predetermined amplitude which will brighten or intensify a spot 116 on trace 109′ whenever the filtered magnetically-induced sinusoidal synchronizing signal changes polarity from negative to positive. Accordingly, the angular orientation of spot 116 relative to the radio-station reference position 111′ characterizes the angular bearing of magnetic north relative to the station bearing. At such times, switches 27d′ and 27f must be closed. Closure of switches 27e and 27d′ result in display of a spot 110′ characterizing heading of the boat relative to the same reference radio station bearing. In an alternative construction, part of the output of filter 114 may be shifted in phase 90° and both parts of the output may then be applied to lines 100′ and 102′, in the same manner as are the outputs of radio direction finder circuit 99′ and phase shifter 101′, whereupon the reference position 111′ represents magnetic north, and angular orientations of intensified spots corresponding to the boat and radio station headings may then be read directly in relation to magnetic north. In FIGURE 12, signal waveform 117 represents the type of R.F. signal which is induced in coil 96′ and is modulated cyclically in amplitude in accordance with the rate of rotation of that motor-driven coil. Detection of this signal results in a deflection signal 118 for the C.R.T. indicator, the 90°-displaced signal 119 being produced by the phase shifter for application to the indicator as the cosine signal needed to develop a circular trace. Waveform 120 represents the magneticaly-induced sinusoidal signal, and 121 is its phase-shifted cosine counterpart, both of the latter signals are displaced in phase from the signals 118 and 119 resulting from sensing of electromagnetic radiation, unless the station and magnetic north happen to be at the same heading relative to the boat. At times $t_1$ and $t_2$, the aforementioned intensifying pulses, such as pulses 122 and 123 are generated by trigger circuit 115. Induced signals, whether R.F. or derived from the earth's magnetic field, may be obtained with the desired sine and cosine function relationships by using two mutually-perpendicular rotated induction windings, rather than a single winding and phase shifter.

It will be understood by those skilled in the art that the teachings relating to unique displays of measurement data, characterizing magnitude and/or sense or direction, may also be exploited in connection with other equipments, such as those which detect engine speed and engine synchronizations, and the like. Therefore, it should be understood that the embodiments and practices described and portrayed have been presented by way of disclosure, rather than limitation, and that various modifications, substitutions and combinations may be effected without departure from the spirit and scope of this invention in its broader aspects.

What I claim as new and desire to secure by Letters Patent of the United States is:

1. Craft navigation apparatus comprising an indicator having a display surface and control means for exciting portions of said surface into illumination in accordance with electrical control signals applied to said control means, navigation measurement indicia fixed in relation to said display surface, a plurality of electrical transducers each sensing the relation of a supporting craft to a different navigation condition under measurement and producing electrical signals characterizing said relation, electrical circuit means translating said electrical signals from each of said transducers into different control signals, and means for selectably applying to said control means each of the different control signals from said circuit means, the excitations of said control means by at least one of said different control signals exciting on said display surface an illuminated trace, having a circular curvature, characterizing a navigation condition under measurement in relation to said indicia.

2. Craft navigation apparatus comprising an indicator having a display surface and control means for exciting portions of said surface into illumination in accordance with electrical control signals applied to said control means, navigation measurement indicia fixed in relation to said display surface, a plurality of means each sensing the relation of a supporting craft to a different navigation condition under measurement and each producing electrical signals characterizing said relation, at least one of said sensing and signal-producing means producting electrical signals including signals which are related as sine and cosine functions, and means for selectably applying to said control means as the control signals therefor the electrical signals produced by different ones of said sensing and signal-producing means, said signals from one of said means which include signals related as sine and cosine functions exciting on said display surface an illuminated trace, having a circular curvature, characterizing a navigation condition under measurement in relation to said indicia.

3. Craft navigation apparatus as set forth in claim 2 wherein said one of said sensing and signal-producing means includes a transducer having a two-phase generator rotated at speeds related to a condition under measurement, said signals related as sine and cosine functions being produced by two different phase windings of said generator.

4. Craft navigation apparatus as set forth in claim 3 wherein said one of said sensing and signal-producing means includes a rotor driven in accordance with the relative speeds existing between the supporting craft and an ambient fluid medium, and driving said generator, and wherein the radial sizes of said trace characterize said relative speeds.

5. Craft navigation apparatus as set forth in claim 4 wherein said rotor comprises an anemometer mounted on the supporting craft, means for mounting the stator of said generator in a predetermined orientation relative to the supporting craft, a wind vane, means for mounting said wind vane on the supporting craft, cooperating means fixed in relation to said wind vane and angularly fixed in relation to said anemometer producing electrical output signals characterizing the times during relative rotations between said anemometer and wind vane when said anemometer and wind vane are in a predetermined angular relationship to one another, said signals from said one of said means including signals related to said output signals, and wherein said means applying electrical signals to said control means includes means applying signals relates to said output signals and thereby producing irregularities in said trace at angular positions characterizing said times when said vane and anemometer are in said predetermined angular relationship, whereby the radial sizes of said trace characterize wind velocity and the angular orientations of said irregularities on said display surface characterize wind direction relative to the supporting craft.

6. Craft navigation apparatus as set forth in claim 5 wherein said sensing and signal-producing means includes electrical means producing substantially uniform-width short pulses responsive to said output signals, and wherein said signal-applying means excites said display surface through said control means by changing the intensity of illumination of said trace during the occurrence of each of said pulses.

7. Craft navigation apparatus as set forth in claim 6 wherein said indicator comprises a cathode ray tube having an intensity control grid in said control means, and wherein said signal-applying means excites said control grid with said pulses to brighten illuminations of said trace in response to said pulses.

8. Craft navigation apparatus as set forth in claim 2 wherein said one of said sensing and signal-producing means includes low-frequency oscillator and phase shift means producing said signals related as sine and cosine functions, and further includes means for generating and transmitting from the supporting craft bursts of signals of frequency relatively high and duration relatively short as compared with the cyclic variations of said signals related as sine and cosine functions and each being similarly synchronized in phase with said related signals, and further includes means responsive to reflections of said transmitted bursts of signals received on the supporting craft, said sensing and signal-producing means producing signals characterizing the times after transmission when said bursts are received and exciting said display surface through said control means by producing irregularties in said trace characterizing the times during each circular trace when said bursts are received.

9. Craft navigation apparatus as set forth in claim 8 wherein said generating and transmitting means comprises an oscillator tuned to a supersonic frequency, and a trigger circuit responsive to the output of the low-frequency oscillator restricting transmissions of supersonic electrical signals from said supersonic oscillator to a transmitter to intervals which are synchronized with and short in relation to the cyclic variations of the output of the low-frequency oscillator.

10. Craft navigation apparatus as set forth in claim 9 wherein said generating and transmitting means includes an underwater supersonic transducer adapted to be mounted on the supporting craft for transmitting said supersonic signals and receiving reflections thereof, whereby the angular orientations of said irregularities in said trace in relation to a reference position on said display surface characterize the distance through water from said transducer and a surface reflecting said supersonic signals transmitted therefrom.

11. Craft navigation apparatus as set forth in claim 10 wherein said underwater transducer is adapted to direct transmissions downwardly therefrom, wherein said low-frequency oscillator and phase shift means includes a pair of oscillators respectively tuned to different multiples of the same low frequency and means for selectably connecting said trigger circuit for response to different ones of said oscillators, whereby said angular orientations of said irregularities characterize depth of water below the supporting craft in different depth ranges depending upon which of said oscillators selectably controls said trigger circuit.

12. Craft navigation apparatus as set forth in claim 10 wherein said means exciting said display surface and producing irregularities in said trace includes a flip-flop circuit producing output pulses and applying said pulses through said control means to control the intensity of illumination of said trace during occurrences of said pulses, and further includes means applying signals responsive to the transmitted and received bursts to said flip-flop circuit and thereby controlling the duration of said output pulses.

13. Craft navigation apparatus as set forth in claim 12 wherein said indicator comprises a cathode ray tube having an intensity control grid in said control means, and wherein said flip-flop circuit applies to said control grid said pulses which are of polarity and amplitude in the intervals between said transmitted and received bursts which cause said illuminations of said trace to be blanked, whereby the angles over which said trace is blanked characterize the depths of water below the supporting craft.

14. Craft navigation apparatus comprising an indicator having a display surface and control means for exciting portions of said surface into illumination in accordance with electrical control signals applied to said control means, navigation measurement indicia fixed in relation to said display surface, a plurality of electrical transducers each sensing the relation of a supporting craft to a different navigation condition under measurement and producing electrical signals characterizing said relation, electrical circuit means translating said electrical signals from each of said transducers into different control signals, and means for selectably applying to said control means each of the different control signals from said circuit means, the excitations of said control means by each of said different control signals exciting on said display surface an illuminated trace, having a circular curvature, characterizing a navigation condition under measurement in relation to said indicia.

15. Craft navigation apparatus as set forth in claim 14 wherein the curvature of said illuminated trace is representative of the magnitude of the navigation condition monitored.

16. Craft navigation apparatus comprising an indicator having a display surface and control means for exciting portions of said surface into illumination in accordance with electrical control signals applied to said control means, navigation measurement indicia fixed in relation to said display surface, an electrical transducer sensing the relation of the supporting craft to the navigation condition under measurement, said transducer comprising a first and second signal producing means to produce electrical signals characterizing said relation, electrical circuit means translating said electrical signals from said first and second signal producing means into control signals, and means for selectably applying to said control means the control signals from said circuit means, the excitations of said control means by control signals from said first signal producing means exciting on said display surface an illuminated trace having a circular curvature and the excitation of said control means by control signals from said second signal producing means exciting on said display surface along said circular trace a brightly illuminated point, said point characterizing a navigation condition under measurement in relation to said indicia.

17. Craft navigation apparatus as set forth in claim 16 wherein said sensing and first signal-producing means includes winding means having winding turns which are substantially parallel and vertical and means for rotating said winding means at a substantially constant speed on the supporting craft, whereby electrical signals are induced therein by an ambient electrical field with sinusoidal variations depending upon the orientations of said field, and means producing said signals related as sine and cosine functions from said induced signals.

18. Craft navigation apparatus as set forth in claim 17 wherein said second signal-producing means includes a switching means held in a fixed angular position adapted to be closed by said means for rotating said winding to produce a signal representative of the position of said supporting craft relative to said rotating means.

19. A craft navigation apparatus as set forth in claim 18 wherein said display surface comprises a cathode ray tube and said first and second signal-producing means includes means producing substantially sinusoidal signals related to sinusoidal variations of electrical signals induced in said winding means by both ambient magnetic and electromagnetic fields, said sinusoidal signals having sinusoidal variations depending upon the orientations of said fields, said signals being applied to the deflection circuit lines of said cathode ray tubes to produce said circular trace and said second signal producing means including trigger circuit means producing uniform relatively short pulses synchronized with changes from one polarity to another having one of said sinusoidal signals related to one of said fields, and wherein said means applying electrical signals to said control means includes means applying said pulses to the control grid line of said cathode ray tube and thereby producing irregularities in said trace the angular orientations of which on said display surface characterize the directionality of said one of said fields.

20. Craft navigation apparatus comprising an indicator having a display surface and control means for exciting portions of said surface into illumination in accordance with electrical control signals applied to said control means, navigation measurement indicia fixed in relation to said display surface, a plurality of electrical transducers each sensing the relation of a supporting craft to a different navigation condition under measurement and producing electrical signals characterizing said relation, electrical circuit means translating said electrical signals from each of said transducers into different control signals, and means for selectably applying to said control means each of the different control signals from said circuit means, the excitations of said control means by at least one of said different control signals exciting on said display surface an illuminated trace, having a circular curvature, characterizing a navigation condition under measurement in relation to said indicia, said indicia including indicia representing variables defined in terms of radial magnitude and indicia representing variables defined in terms of angular direction, each of said different navigation conditions being displayed in terms of either radial magnitude or angular direction.

21. Craft navigation apparatus as set forth in claim 14 wherein said one of said sensing and signal-producing means includes winding means having winding turns which are substantially parallel and vertical and means for rotating said winding means at a substantially constant speed on the supporting craft, whereby electrical signals are induced therein by an ambient electrical field with sinusoidal variations depending upon the orientations of said field, and means producing said signals related as sine and cosine functions from said induced signals.

22. Craft navigation apparatus as set forth in claim 21 wherein said one of said sensing and signal-producing means includes cooperating means rotated with said winding means and mounted in fixed relation to the supporting craft producing electrical output signals characterizing the times when said rotated winding means is in a predetermined angular relationship to the supporting craft, and wherein said means applying electrical signals to said control means includes means applying signals related to said output signals and thereby producing irregularities in said trace at angular positions characterizing said times when said winding means is in said predetermined angular relationship, whereby the angular orientations of said trace irregularities on said display surface characterize directionality of said field relative to the supporting craft.

23. Craft navigation apparatus as set forth in claim 22 wherein said means producing signals related as sine and cosine functions produces said related signals from signals induced in said winding means by radio-frequency electromagnetic fields, whereby said trace irregularities characterize directionality of radio stations relative to the supporting craft.

24. Craft navigation apparatus as set forth in claim 23 wherein said means producing signals related as sine and cosine functions produces said related signals from signals induced in said winding means by the earth's magnetic field, whereby said trace irregularities characterize directionality of the earth's magnetic field relative to the supporting craft.

25. Craft navigation apparatus as set forth in claim 21 wherein said display surface comprises a cathode ray tube and said one of said sensing and signal-producing means includes means producing substantially sinusoidal signals related to sinusoidal variations of electrical signals induced in said winding means by both ambient magnetic and electromagnetic fields, said sinusoidal signals having sinusoidal variations depending upon the orientations of said fields, said signals being applied to the deflection circuit lines of said cathode ray tube to produce said circular trace and further includes trigger circuit means producing uniform relatively short pulses synchronized with changes from one polarity to another of one of said sinusoidal signals related to one of said fields, and wherein said means applying electrical signals to said control means includes means applying said pulses to the control grid of said cathode ray tube and thereby producing irregularities in said trace the angular orientations of which on said display surface characterize the directionality of said one of said fields.

26. Craft navigation apparatus as set forth in claim 22 wherein said indicator comprises a cathode ray tube having an intensity control grid in said control means, and wherein said signal-applying means excites said control grid with said output signals to brighten illuminations of each said trace at a discrete spot therealong characterizing said directionality.

27. Craft navigation apparatus as set forth in claim 5 further comprising log means producing direct current electrical signals the magnitudes of which characterize the speed of the supporting craft in water, and wherein said means applying electrical signals to said control means includes means superimposing said direct current signals upon one of said signals related as sine and cosine functions, whereby said irregularities in said trace are at angular positions from a center of said trace produced without a superimposing of said signals which characterizes resultant direction of movement of the supporting craft and are at radial distances from said center characterizing resultant velocity of the supporting craft.

28. Craft navigation apparatus as set forth in claim 27 wherein said sensing and signal-producing substantially uniform-width short pulses responsive to said output signals, wherein said indicator comprises a cathode ray tube having an intensity control grid in said control means, and wherein said signal-applying means excites said control grid with said pulses to brighten illumination of a discrete spot along each said trace in response to said pulses.

References Cited

UNITED STATES PATENTS

| | | | |
|---|---|---|---|
| 1,952,879 | 3/1934 | Martin | 343—118 |
| 2,233,275 | 2/1941 | Wolff | 343—118 |
| 2,263,377 | 11/1941 | Busignies et al. | 343—118 |

OTHER REFERENCES

Schlang et al.: Military Automation, September–October 1958, pp. 172, 173.

RODNEY D. BENNETT, *Primary Examiner.*

RICHARD A. FARLEY, *Examiner.*

R. E. BERGER, *Assistant Examiner.*